United States Patent [19]
Funabashi et al.

[11] Patent Number: 5,208,898
[45] Date of Patent: May 4, 1993

[54] ADAPTIVE KNOWLEDGE INFERENCE METHOD AND SYSTEM

[75] Inventors: Motohisa Funabashi, Sagamihara; Tohru Otokita, Yokohama, both of Japan

[73] Assignees: Hitachi, Ltd.; Hitachi Control Systems, Inc., both of Tokyo, Japan

[21] Appl. No.: 359,023

[22] Filed: May 30, 1989

[30] Foreign Application Priority Data

Jun. 8, 1988 [JP] Japan .............................. 63-139325

[51] Int. Cl.$^5$ ............................................ G06F 15/18
[52] U.S. Cl. ....................................... 395/50; 395/51; 395/900
[58] Field of Search .................. 364/513, 152, 507; 395/900, 61

[56]  References Cited

U.S. PATENT DOCUMENTS

| | | | |
|---|---|---|---|
| 4,712,182 | 12/1987 | Wakamori et al. | 364/507 |
| 4,730,259 | 3/1988 | Gallant | 364/513 |
| 4,754,410 | 6/1988 | Leech et al. | 364/513 |
| 4,763,277 | 8/1988 | Ashford et al. | 364/513 |
| 4,825,353 | 4/1989 | Jenkins | 364/152 |
| 4,860,213 | 8/1989 | Bonissone | 364/513 |
| 4,918,620 | 4/1990 | Ulug | 364/513 |
| 4,984,174 | 1/1991 | Yasunobu et al. | 364/513 |

OTHER PUBLICATIONS

Leung et al., "A Fuzzy Knowledge-Based System Shell-System Z-1", Proc. TENCDN 87, IEEE, Aug. 1987, 655-659.

L. A. Zadeh, "Outline of a New Approach to the Analysis of Complex Systems and Decision Processes", IEEE Transactions on Systems, Man, and Cybernetics, vol. SMC-3, No. 1, Jan. 1973, pp. 28-44.

E. H. Mamdani, et al., "Application of Fuzzy Algorithms for Control of Simple Dynamic Plant", Proceedings of the Institution of Electrical Engineers Control & Science, Proc. IEE, vol. 121, No. 12, Dec. 1974, pp. 1585-1588.

P. Jackson, Introduction to Expert System, Addison-Wesley (1986), "Chapter 6—MYCIN: Medical Diagnosis Using Production Rules", pp. 93-106.

Primary Examiner—Michael R. Fleming
Assistant Examiner—Robert W. Downs
Attorney, Agent, or Firm—Fay, Sharpe, Beall, Fagan, Minnich & McKee

[57]  ABSTRACT

A knowledge processing system in which a grade representing a degree at which an event is satisfied or unsatisfied is obtained depending on a condition part represented in a form of a logical arithmetic expression including an expression of a fuzzy logic and on a grade of satisfaction of the condition part generates rules on assumption of unmeasurable events associated with states of the external field of the system so as to add the rules to the rules related to the unmeasurable events. Forecast of a value of a measurable event is more correctly achieved depending on grades of satisfaction of the unmeasurable events and grades of satisfaction of measurable events. A warning may also be issued according to the forecasted value.

16 Claims, 10 Drawing Sheets

FIG. 3
OBJECT DATA

```
(OBJECT DATA NAME
      SLOT NAME 1    SLOT VALUE 1
      SLOT NAME 2    SLOT VALUE 2
      SLOT NAME 3    SLOT VALUE 3
           :              :
      SLOT NAME i    SLOT VALUE i )
```

FIG. 4
RULE REPRESENTING FORMAT

```
(RULE NAME
    IF ( OBJECT DATA NAME 1   SLOT NAME 1   RELATIONAL OPERATOR   SLOT VALUE 1
                              SLOT NAME 2   RELATIONAL OPERATOR   SLOT VALUE 2
                                   :                :                   :
                              SLOT NAME j   RELATIONAL OPERATOR   SLOT VALUE j )
                                   :
       ( OBJECT DATA NAME k   SLOT NAME k   RELATIONAL OPERATOR   SLOT VALUE k
                                   :                :                   :
                              SLOT NAME ℓ   RELATIONAL OPERATOR   SLOT VALUE ℓ )
    THEN ( OBJECT DATA NAME m   PROCEDURE  ( SLOT NAME m   SLOT VALUE m ))
                                   :
         ( OBJECT DATA NAME n   PROCEDURE  ( SLOT NAME n   SLOT VALUE n )))
```

FIG. 5
FLOW VOLUME Q

FIG. 6
FLOW SPEED V

FIG. 7
CONCENTRATION C

FIG. 8

RULE TABLE

| EVENT OF IF PART | | EVENT OF THEN PART |
|---|---|---|
| FLOW VOLUME (Q) | FLOW SPEED (V) | CONCENTRATION (C) |
| CONDITION 1 — LARGE | LARGE | LARGE |
| CONDITION 1 — LARGE | SMALL | LARGE |
| CONDITION 1 — SMALL | LARGE | MIDDLE |
| CONDITION 1 — SMALL | SMALL | LARGE |
| CONDITION 2 — LARGE | LARGE | SMALL |
| CONDITION 2 — LARGE | SMALL | MIDDLE |
| CONDITION 2 — SMALL | LARGE | SMALL |
| CONDITION 2 — SMALL | SMALL | SMALL |

FIG. 9

RULE TABLE (PRESERVED VOLUME)

| PRESERVED VOLUME (Qr) | FLOW VOLUME (Q) | FLOW SPEED (V) | CONCENTRATION (C) |
|---|---|---|---|
| LARGE | LARGE | LARGE | LARGE |
| | | SMALL | LARGE |
| | SMALL | LARGE | MIDDLE |
| | | SMALL | LARGE |
| SMALL | LARGE | LARGE | SMALL |
| | | SMALL | MIDDLE |
| | SMALL | LARGE | SMALL |
| | | SMALL | SMALL |

FIG. 10

( PREVIOUS FLOW VOLUME ( FIG.5 )
LARGE 0.75
SMALL 0.25 )

FIG. 11

( PREVIOUS FLOW SPEED ( FIG.6 )
LARGE 0.25
SMALL 0.75 )

FIG. 12

( PRESENT FLOW VOLUME ( FIG.5 )
LARGE 0.25
SMALL 0.75 )

FIG. 13

( PRESENT FLOW SPEED ( FIG.6 )
LARGE 0.25
SMALL 0.75 )

FIG. 14

( PRESENT CONCENTRATION ( FIG.7 )
LARGE 0.5
MIDDLE 0.5
SMALL 0.0 )

FIG. 15

ESTIMATION RULE ( ESTIMATION RULE 1
    IF ( PRESENT CONCENTRATION    LARGE  —  ? GRADE 1 )
       ( PREVIOUS FLOW VOLUME     LARGE  >  ? GRADE 1 )
       ( PREVIOUS FLOW SPEED      LARGE  >  ? GRADE 1 )
       ( PRESENT PRESERVED VOLUME  LARGE  >  ? GRADE 1 )
  THEN ( PRESENT PRESERVED VOLUME  SET ( LARGE  ? GRADE 1 ) ) )

FIG. 16

PULE TABLE AFTER ESTIMATION OF Qr

| PRESERVED VOLUME (Qr) | FLOW VOLUME (Q) | FLOW SPEED (V) | CONCENTRATION (C) |
|---|---|---|---|
| LARGE 0.5 | LARGE 0.75 | LARGE 0.25 | LARGE 0.5 |
| | | SMALL 0.75 | LARGE 0.5 |
| | SMALL 0.25 | LARGE 0.25 | MIDDLE 0.5 |
| | | SMALL 0.75 | LARGE 0.5 |
| SMALL 0.0 | LARGE 0.75 | LARGE 0.25 | SMALL 0.0 |
| | | SMALL 0.75 | MIDDLE 0.5 |
| | SMALL 0.25 | LARGE 0.25 | SMALL 0.0 |
| | | SMALL 0.75 | SMALL 0.0 |

FIG. 17

( PRESENT PRESERVED VOLUME
        LARGE 0.5
        SMALL 0.0 )

FIG. 18

(ESTIMATION RULE 1
   IF (PRESENT PRESERVED VOLUME  LARGE → ? GRADE 1)
      (PRESENT FLOW VOLUME       LARGE → ? GRADE 2)
      (PRESENT FLOW SPEED        LARGE → ? GRADE 3)
      (ESTIMATED CONCENTRATION  LARGE < ? GRADE 1)
                                      < ? GRADE 2)
                                      < ? GRADE 3)
THEN (ESTIMATED CONCENTRATION SET (LARGE, MIN (? GRADE 1, ? GRADE 2,
                                                      ? GRADE 3))))

FIG. 19

RULE TABLE OF CONCENTRATION AFTER ESTIMATION

| PRESERVED VOLUME (Qr) | FLOW VOLUME (Q) | FLOW SPEED (V) | CONCENTRATION (C) |
|---|---|---|---|
| LARGE 0.5 | LARGE 0.25 | LARGE 0.25 | LARGE 0.5 |
| | | SMALL 0.75 | LARGE 0.5 |
| | SMALL 0.75 | LARGE 0.25 | MIDDLE 0.5 |
| | | SMALL 0.75 | LARGE 0.5 |
| SMALL 0.0 | LARGE 0.25 | LARGE 0.25 | SMALL 0.0 |
| | | SMALL 0.75 | MIDDLE 0.0 |
| | SMALL 0.75 | LARGE 0.25 | SMALL 0.0 |
| | | SMALL 0.75 | SMALL 0.0 |

FIG. 20

(ESTIMATED CONCENTRATION
                LARGE  0.5
                MIDDLE 0.5
                SMALL  0.0)

FIG. 21

ESTIMATED CONCENTRATION

FIG. 22

(ESTIMATED VALUE
CONCENTRATION 60.0)

ADAPTIVE KNOWLEDGE INFERENCE METHOD AND SYSTEM

BACKGROUND OF THE INVENTION

The present invention relates to an adaptive knowledge decision system in a knowledge base system, and in particular, to an adaptive knowledge inference method and a knowledge processing system therefor. The invention is suitable for estimating knowledge that can be adapted to obtain an inference. The estimation is particularly applicable to a case where there exists rules referencing primary events not provided with a determining means or where there exist various knowledge items including events and rules respectively associated with an object, the knowledge items overlap with each other and change continuously with respect to time.

Fuzzy inference, fuzzy subsets of events to be measured, and applications of fuzzy algorithms have been described in detail in articles such as L. A. Zadeh, "Outline of a New Approach to the Analysis of Complex Systems and Decision Processes", IEEE Trans., Vol. SMC-3, No. 1, January 1973, pp. 28–44 and E. H. Mamdani et al., "Application of fuzzy algorithms for control of simple dynamic plant", PROC, IEE, Vol. 121, No. 12, December 1974, pp. 1585-1588.

In the conventional knowledge base system, vague primary appear for which no determining means such as measuring means are provided. In a case where there exists a rule which refers to these primary events, and since an inference operation cannot be achieved by use of knowledge thereabout, the execution of the knowledge is avoided or skipped or omitted so as to enable the inference to be effected. Alternatively, there is configured a different knowledge for estimation so as to predict the primary events by executing the knowledge, thereby enabling the events to be adaptive to the inference.

Also in a case where there exist a plurality of various knowledge items associated with an object and it is necessary to determine appropriate knowledge items to be adapted or employed for the inference, it has been a common practice to classify the knowledge items in advance as described above, a different knowledge judges the appropriate and, knowledge items for adaptation to the inference, thereby determining or forecasting the adaptive knowledge through the inference. As an example in which the knowledge cannot be clearly classified and hence the adaptation is effected by allowing overlapping of knowledge, reference may be made to an article: P. Jackson, "Introduction to Expert System", Addison Wesley, 1986, Chapter 6, MYCIN: Medical Diagnosis using Production Rules, pp. 93-106. In the MYCIN, for individual events and rules respectively described as knowledge, there is introduced a grade or magnitude representing uncertainty ranging from −1.0 to 1.0, thereby enabling the knowledge to be adapted to the inference. First, due to the grade, there are allowed overlapped portions between the respective events and rules each having an arbitrary uncertainty. Next, for the inference, the inference engine or mechanism refers the grade of each event and each rule such that events associated with the same conclusion are combined with each other through an arithmetic rule effected with respect to the grade. In consequence, it is possible also after the inference that the events and rules are adapted to the inference in the state where the overlapping exists between the events and rules.

In the prior art technology, due to existence of vague primary events for which no determining means are provided, the execution of an inference with knowledge thereabout is avoided or is omitted as described above, which means that a portion of knowledge is missing and hence which leads to a problem that the application range of the knowledge is restricted, namely, the knowledge becomes incomplete. Alternatively, in a case where the different knowledge is introduced, it is indispensable to construct such new knowledge; furthermore, considerations are required to be given to the adequacy of the respective knowledge items and the completeness as well as consistency of the knowledge as the whole, which imposes a heavy load on the operator's work. If the knowledge thus introduced is heterogeneous for the existing knowledge, for example, a mathematical model for a rule, there arises a problem that the integrity of the knowledge is lost and hence this operation is not appropriate. In addition, in a case where due to existence of various knowledge items associated with events and rules of objects, the knowledge items are classified so as to predict adaptive knowledge based on judging knowledge thus obtained, there also occurs a problem similar to the problem above, for example, there is required the different knowledge for the judgment. Furthermore, when the knowledge of the object cannot be clearly classified, the adaptation of the knowledge is impossible. Particularly, in a case where the characteristics of the object are not sufficiently determined, unclearness and uncertainty appear in the overall knowledge, and hence the clear classification thereof cannot be conducted such that adaptive knowledge items overlap with each other in many cases; moreover, the estimated knowledge is attended with vagueness in an ordinary case. According to the method of MYCIN described above, although there exists the overlapping as a result of the introduction of the grade representing the uncertainty, the grade related to the rule is a static value beforehand assigned thereto and hence cannot be dynamically changed. For example, in a case where a state of an object undergoes a transition with respect to time in a continuous fashion, there may exist a plurality of rules to be adapted thereto and values of the grade applied to the rules may dynamically and continuously change. However, in this case, at an intermediate point of an inference of the grade itself, there is required an inference effected based on an external input and on different knowledge, namely, it is impossible to achieve the consecutive acquisition and update for the inference based on the own knowledge. In addition, the conventional methods including that of MYCIN are provided with an inference engine or mechanism, and modification as well as reconstruction thereof to configure a desired method are attended with difficulties. Namely, it is required for the user to search for and to select a knowledge base system meeting the demand or to construct such a knowledge base, which considerably increases the amount of work required therefor.

SUMMARY OF THE INVENTION

It is therefore an object of the present invention to provide a method employed in a case where there exist primary events for which no determining means are provided and knowledge represented as rules referring to the primary events for estimating or predicting the events by use of the same knowledge so as to enable the knowledge to be adapted to the inference.

Another object of the present invention is to provide a method employed in a case where there exist a plurality of various knowledge items associated with events and rules respectively of an object of inference such that the knowledge items are overlapped with each other in adaptation thereof to the inference and the adaptive knowledge continuously varies with respect to time for estimating or predicting the adaptive knowledge.

Still another object of the present invention is to provide a knowledge predicting system wherein also when there exist primary and independent events for which no determining means are provided, it is possible to sustain the completeness of the knowledge without employing different knowledge to estimate the events to avoid or omit such primary events and the rules and also to sustain the adequacy, consistency, and integrity of the knowledge by using the knowledge which is adopted for an ordinary inference.

Further another object of the present invention is to provide a fuzzy inference system which facilitates a knowledge processing system to be configured or to be applied in a case of an object requiring an online, real-time processing for which measured values are sequentially attained with respect to time and of which a state is also varied.

Still another object of the present invention is to provide an inference system in which an inference portion is constructed on a knowledge base system as an object by use thereof and hence configuration and modification of the knowledge base system itself is unnecessary, which rarely requires any work for the configuration and modification thereof and which facilitates the modification and reconstruction thereof after the knowledge base system is once created.

The objects above are achieved by use of the following technological means.

Events as knowledge representing an object are combined with rules as knowledge so as to establish a relation of combination. In addition, the content and the value of each event can be expressed with an arbitrary grade like in the case of MYCIN. In an ordinary inference, for example, in a case where outputs are to be inferred when all inputs are supplied, inference is sequentially conducted according to the contents of the inputs, rules associated therewith, and combination relations therebetween, thereby outputting a final result. For an inference of a primary event not provided with determining means and for an inference of adaptive rules, it is natural to employ the same knowledge and the relations. That is, where there exist events and rules, it is only necessary to use relations of combination therebetween in a converse fashion and to effect comparison between the grade representing the content and value of the current state of each event and the rules. In a case where an estimation is conducted for a primary event which is unknown but to be assumed and for which no determining means are provided, a grade of another determined event is assigned to the rule referring the event; whereas when an adaptive rule is to be predicted, the grades of all related events are assigned to the rules. Comparison is achieved between the combination relations of the rules and the grades of the contents of the current states of the events so as to judge a state determined depending on the combination relation between a predicted event and another event or the combination relations with respect to the rules associated with all events, thereby enabling the content, adaptive state, or grade of each event to be estimated. If areas or ranges are beforehand known for the states of estimated knowledge and the grades, it may be possible to judge the adequacy, namely, there is conducted comparison with such area or ranges so as to issue a report if the areas or ranges are exceeded. By achieving the operation above at the respective points of time, it is possible to forecast adaptive knowledge at the pertinent point. The technological means above may be achieved by use of the same means if there is established correspondences between the adaptive states of rules and a primary event which represents probability of the rule or for which there is not provided another arbitrary determining means. In addition, by implementing the means above in a knowledge base system as an object by use of the system itself, it is possible to add the means to the system not having the means, thereby constructing a desired knowledge processing system.

This system operates as follows. Assume here that when estimating adaptive knowledge at an arbitrary point of time, there exist events each possessing values and contents determined by measuring means or through inference such that each content is converted or translated so as to be expressed as an arbitrary grade. On the other hand, for rules in which conditions and conclusions are described based on the respective events, there exist combination relations beforehand assigned therebetween. For example, in a case where a condition "if events A, B, and C and events A and B hold, then event C holds" exists; there takes place a relation between A, B and C and a relation between B and C. Ordinarily, when the contents of the events A and B are known, the content of the event C is inferred. In this situation, if A is a primary event for which no determining means are provided and the grade is known for each of the contents of B and C, the values of the grade are assigned to the relations associated with the rules so as to effect comparison with the combination relations of the rules. That is, the inference is effected by determining the grade of A for the values of the grade of B and C and the combination relations of the rules such that the grade of A causes the combination relations between the grade of each event and the rules to be satisfied. Conversely, this is entirely also the case where B is a primary event for which no determining means are provided. Moreover, this also applies to an estimation of a rule if there are established correspondences between events related to the grade of adaptation of rules and a problem to be estimated.

Description will be given of the operation above based on specific mathematical expressions. On assumption that there exists a rule "if A and B then C" with respect to events A, B, and C and that B and D are known as B' and C', A is estimated as follows.

According to an article, Outline of a New Approach to the Analysis of Complex Systems and Decision Processes (IEEE Irons. on SMC, Vol. SMC-3, No. 1, January 1973: pp. 28–44) written by L. A. Zadeh, the rule "if A and B then C" is expressed as follows.

$$\mu_C(w) = V_{u,v}\{(\mu_A(u) \wedge \mu_B(v)) \wedge (\mu_A(u) \wedge \mu_B(v) \wedge \mu_C(w))\} \quad (1)$$

where, $\mu_X(x)$ stands for a grade function for an event X. This expression represents relations between A, B and C and hence may also be consequently described as follows.

$$C = (A \times B) \circ R(A, B:C) \quad (2)$$

Assuming here that when the events A and B are known as A' and B', the conclusion is an event C, which is denoted as C'; the inference is conducted as follows.

$$C' = (A' \times B') \circ R(A, B:C) \quad (3)$$

The problem in this case is that how to specifically obtain A' for given B' and C', which aims at a solution of an equation of this type.

For preparation of a method to solve the equation determined by the expression (3), a solution of the following basic equation will now be considered. Namely, from the following equation, let us obtain X' based on given Y' and R(X:Y).

$$Y' = X' \circ R(X:Y) \quad (4)$$

For this purpose, there will be employed an operator $\alpha$ as follows.

$$a @ b = \begin{cases} 1 : a \leq b \\ b : a > b \end{cases} \quad (5)$$

A function @ is then defined with this operator.

$$X @ Y \quad \mu_{X @ Y}(x,y) = \mu_X(x) \alpha \mu_Y(y) \quad (6)$$

Using this relation, $\hat{X}'$ determined by the following expression is defined as $$\hat{X}' = R(X:Y) @ Y' \quad (7)$$

where, $$\mu_{R(X:Y) @ Y'} \leq \wedge \{\mu_{R(X:Y)}(x,y) \alpha \mu_{Y'}(y)\}$$

and $\hat{X}'$ satisfies $$\hat{X}' \circ R(X:Y) \subset Y' \quad (8)$$

and is the greatest one of X' which satisfies X'∘R(X:Y)=Y'. For the expression (4), there exists a case where the solution cannot be obtained. In such a situation, as defined in the expression (5), 1 (one) is to be assigned thereto, and $\hat{X}'$ stands for the greatest one X' as implied by the expression (8). As described above, although there is included an unsolvable case, defined by the expression (7) provides the expression (4) with a solution. In consequence, assume here that $\hat{X}'$ is X' (estimated value) reversely obtained from Y'.

Based on the method of solving the equation, description will be specifically given of a solution of the equation represented by the expression (3). For the expression (3), the following expression is obtained according to the notation of the expression (1) associated with the grade relation.

$$\mu_{C'}(w) = \vee_{u,v} \{(\mu_{A'}(u) \wedge \mu_{B'}(v)) \\ \wedge (\mu_A(u) \wedge \mu_B(v) \wedge \mu_C(w))\}$$

-continued $$= \left\{ \vee_u (\mu_{A'}(u) \wedge \mu_A(u) \wedge \mu_C(w)) \right\}$$

$$\wedge \left\{ \vee_v (\mu_{B'}(v) \wedge \mu_B(v) \wedge \mu_C(w)) \right\}$$

$$= \mu_{A' \circ R(A:C)}(w) \wedge \mu_{B' \circ R(B:C)}(w) \quad (10)$$

where, $\mu_{A' \circ R(A:C)}$ is estimated by use of the operator $\alpha$ so as to attain $$\mu_{[A' \circ R(A:C)]}{}^n(w) = \mu_{B' \circ R(B:C)}(w) \alpha \mu_{C'}(w)$$

Furthermore, by use of $$\mu_{\hat{A}' \circ R(A:C)}(w) = \vee_u (\mu_{A'}(u) \wedge \mu_{R(A:C)}(u, w))$$

the following results, $$\mu_{\hat{A}'}(u) = \wedge_w (\mu_{R(A:C)}(u,w) \alpha \mu_{A' \circ R(A:C)}(w))$$

obtaining the estimated value for $\mu_{A' \circ R(A:C)}$ $$\mu_{A'}(u) = \wedge_w \{(\mu_{R(A:C)}(u,w) \alpha (\mu_{B' \circ R(B:C)}(w) \alpha \mu_{C'}(w))\} \quad (11)$$

is attained. That is, it is possible to compute the estimated value $\hat{A}'$ of A' from the given B' and C'.

In a case where quantitative values are required for estimated events, like in the case where the grade is computed from the value, it is only necessary to acquire the values from the grade. In addition, when the grade and the quantitative values are beyond a predetermined region or area beforehand set, a warning or notification is supplied, for example, by use of a message so as to request judgment if necessary, thereby taking the adequacy into consideration.

With the provisions above, the ordinary inference and estimation can also be effected by use of the knowledge. In consequence, it is possible to prevent the incompleteness of knowledge which may be caused by the avoidance and omission of knowledge. Furthermore, the user need not check for the adequacy, completeness, a consistency of the knowledge in association with an introduction of the different knowledge which prevent the amount of the associated job from being increased. In addition, the integrity of the knowledge is not impinged upon. Moreover, the method utilized for an estimation of an event is applicable to an estimation of adaptive rules. Namely, the inference of the events and rules can be easily solved by the completely similar technological means described above, namely, in the similar situation, through an operation of inference of knowledge. Moreover, since the technology above is implemented in the existing knowledge base system, the desired system can be easily constructed with a reduced amount of working load to be imposed on the user.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the drawings, description will be given of an embodiment according to the present invention.

Figure 1:
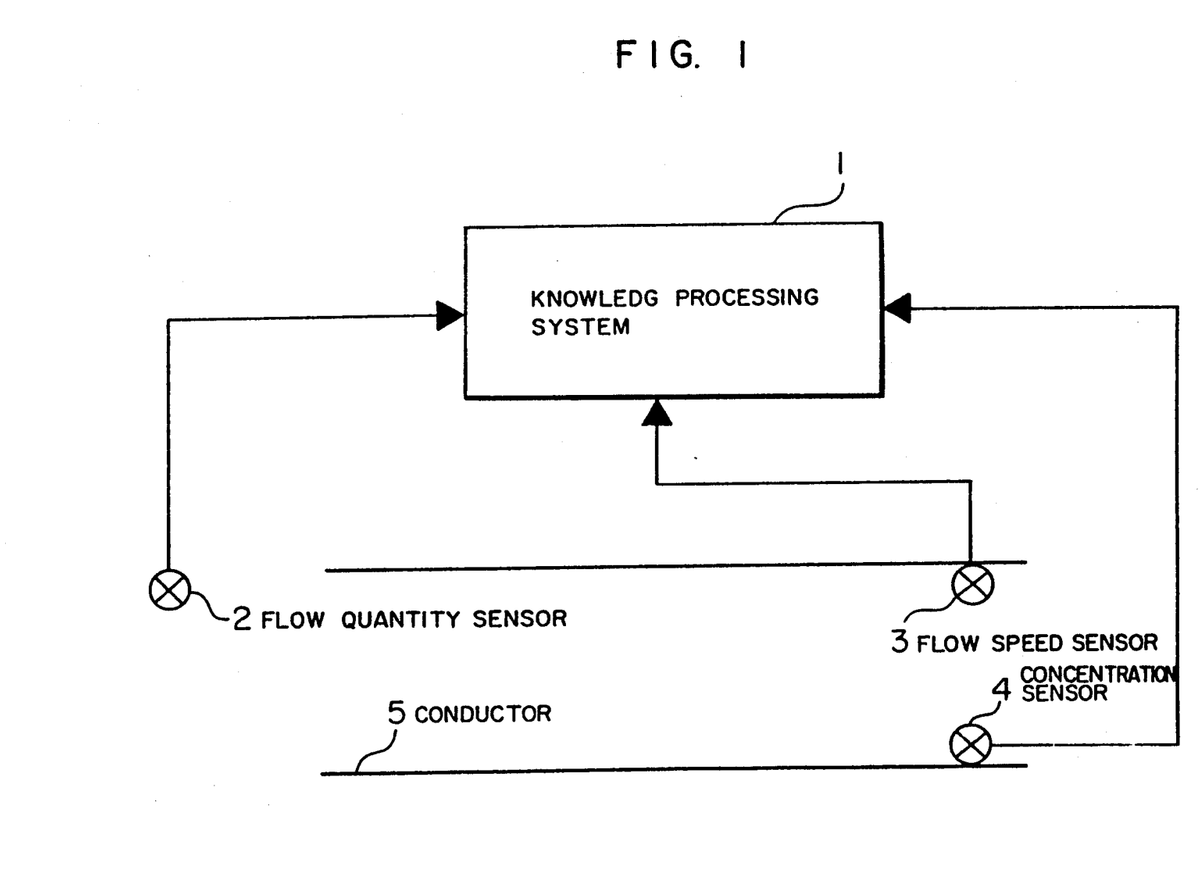
FIG. 1 is a configuration diagram showing the overall constitution of an embodiment according to the present invention.

An object of this embodiment is a knowledge processing system in which when a material flows through a conductor tube having an arbitrary length, an amount of the flow or a flow rate, a velocity or speed of the flow in the conductor, and a concentration of the flowing material are measured so as to forecast a concentration to be developed in the future. FIG. 1 shows the overall configuration of this system, which comprises a knowledge processing system to be constructed in this example, sensors 2, 3 and 4 for measuring objects of this example, namely, a flow quantity sensor 2, a flow speed sensor 3, and a concentration sensor 4, and a conductor 5. These sensors 2 to 4 conduct measurements in a on-line fashion at a predetermined interval of time.

Figure 2:
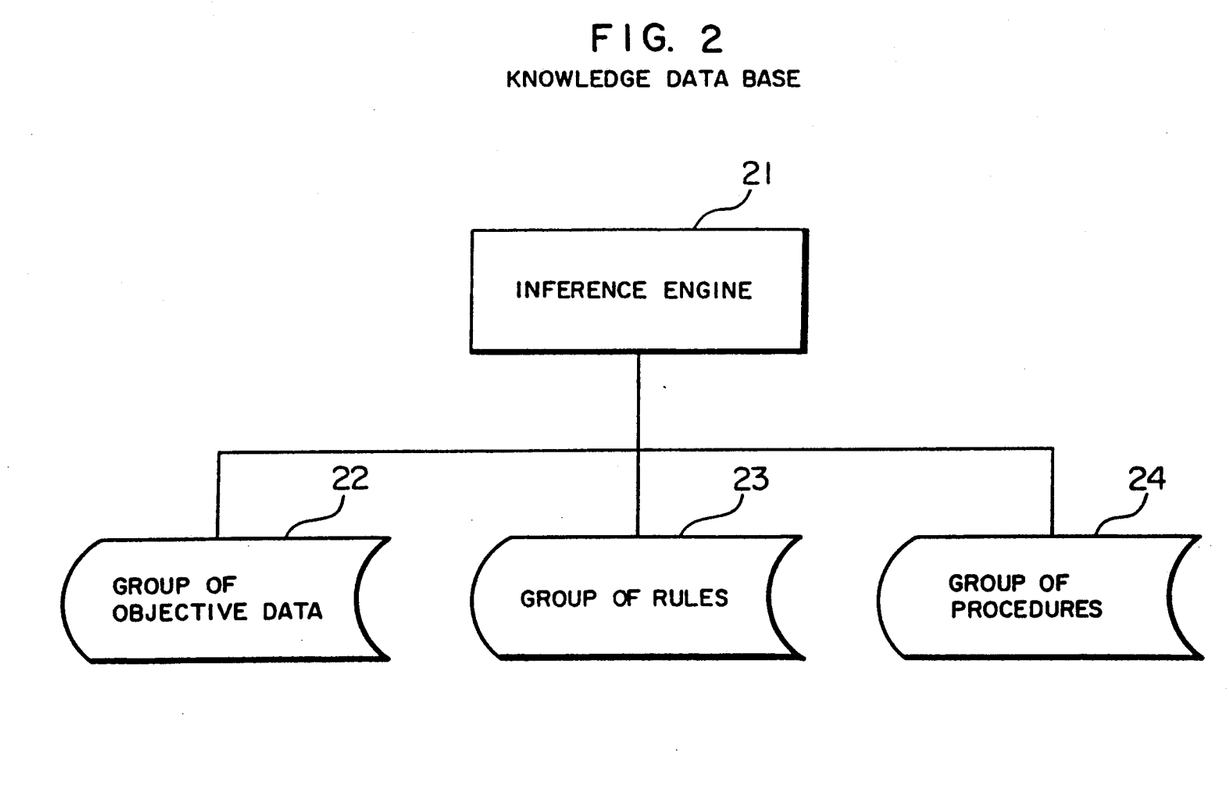
FIG. 2 is a configuration diagram showing a knowledge base system of the embodiment.

FIG. 2 shows a constitution of a knowledge base system employed in this example, which includes an inference mechanism or engine 21 mounted in the system. The inference engine 21 is of the proceed or advance type. An event is represented as object data and a rule is expressed in a form of if ... then ... such that a condition of the if part is collated with the object data so as to execute a conclusion of the then part. Reference numerals 22, 23, and 24 respectively stand for a group of object data, a group of rules, and a group of procedures employed to convert a measured value so as to set the resultant values to the object data.

Figure 3:
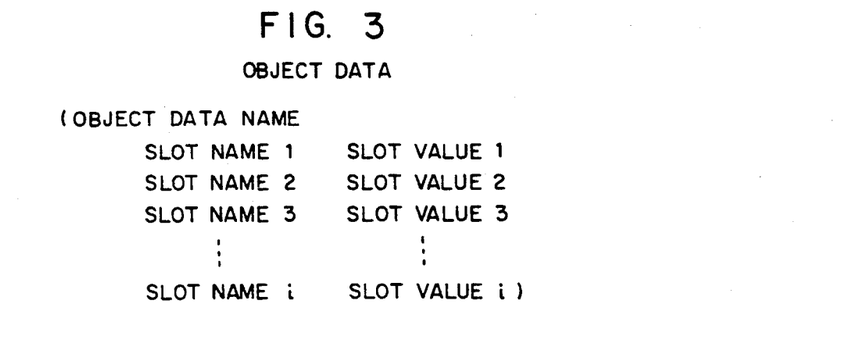
FIG. 3 is a schematic diagram showing an object data format.
Figure 4:
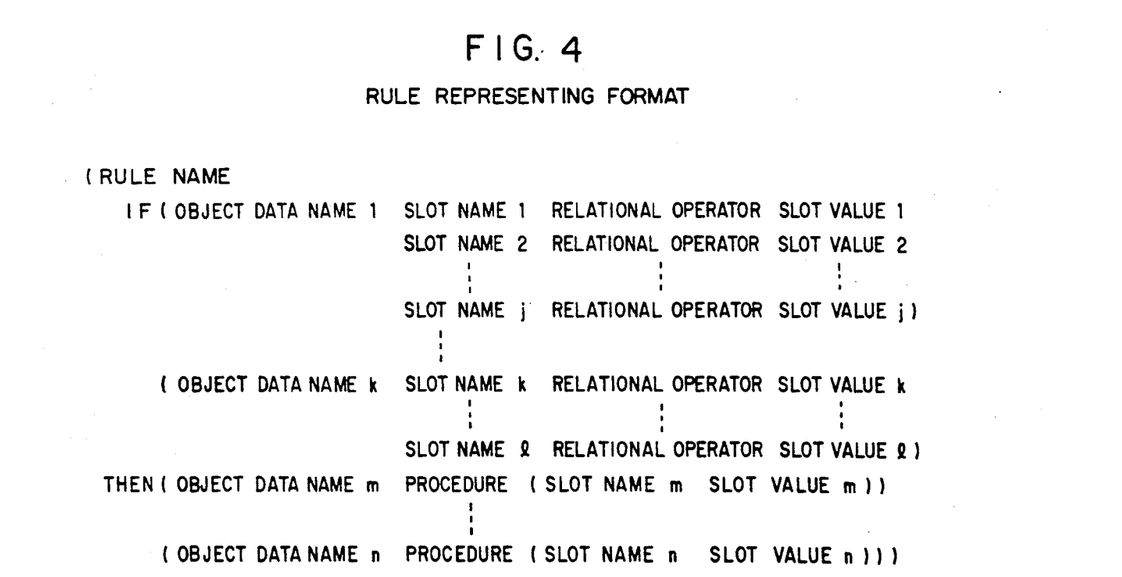
FIG. 4 is a diagram schematically showing a rule format.

FIGS. 3 and 4 show formats to express object data and rules in the knowledge base system of this example. An object data name indicates an individual name representing an arbitrary event. Herebelow, attributes and items possessed by an event and values thereof will be represented by use of a combination of a slot name and a slot value. A rule has also an individual rule name. In an if part, a condition is described in a format corresponding to object data such that a slot name and a slot value are linked by use of a relational operator ($=$, $>$, $<$). In a then part, an operation and/or a procedure are/is described as a conclusion to be effected when the condition is satisfied such that various procedures are kept retained as function names in the group of procedures 24 of FIG. 2. Based on the configuration above, the operation of this example will now be described.

Figure 5:
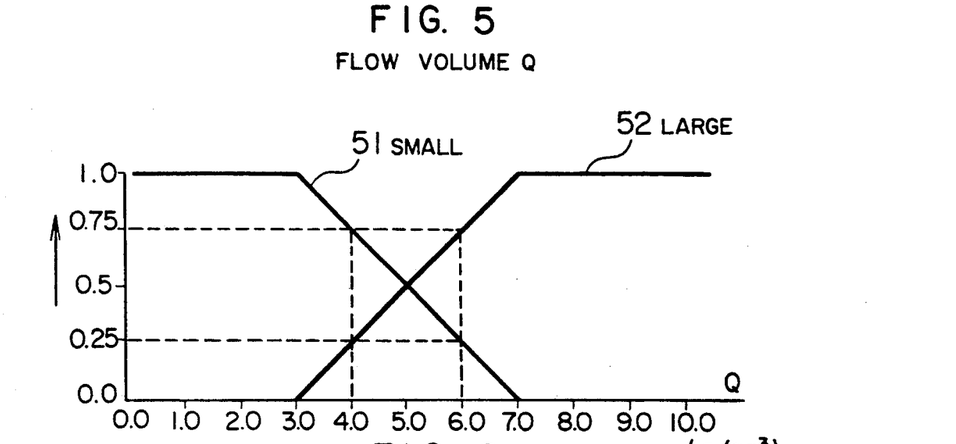
FIGS. 5 to 7 are graphs showing functions employed in the embodiment.
Figure 6:
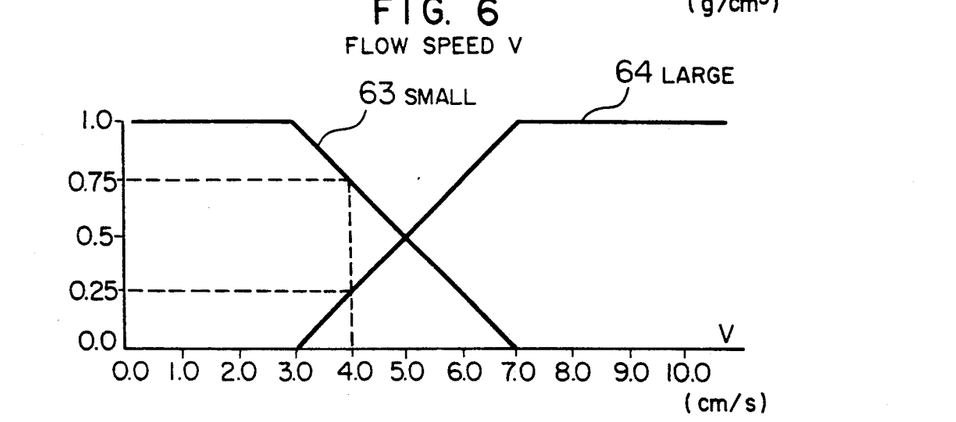
Figure 7:
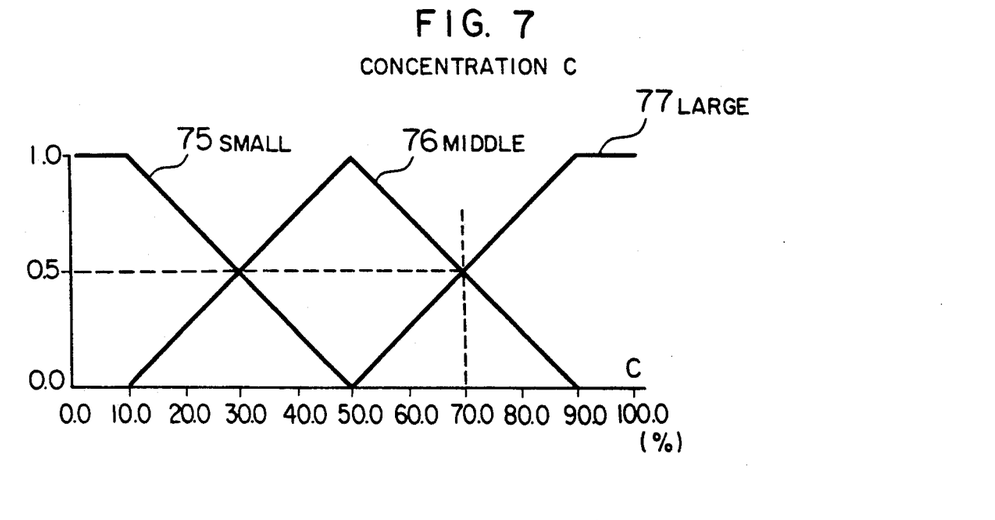
Figure 8:
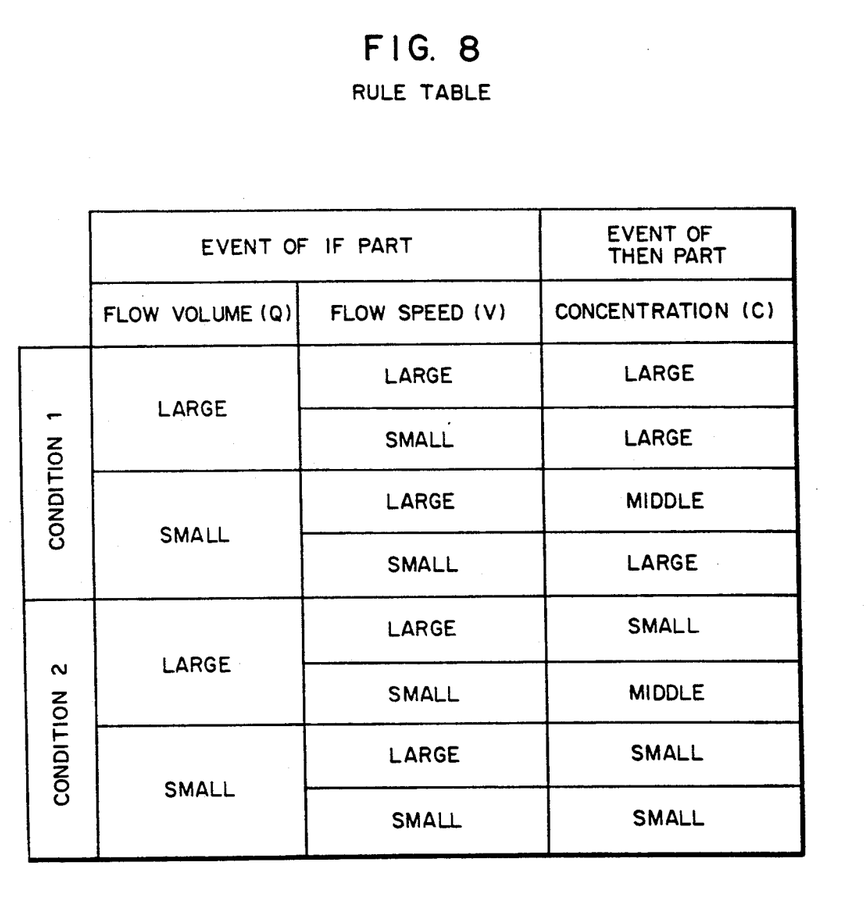
FIG. 8 is a diagram showing a rule table employed in the embodiment.

The problem of this example is specifically described as follows. Assuming that the flow amount Q passing through the conductor 5 at an arbitrary point of time is $Q(t)$, the flow speed or velocity V of the flowing material diffusing or moving through the conductor is represented as $V(t)$, and a concentration C of the flowing material at an arbitrary point of the conductor is $C(t)$ and that these quantities are measured at a predetermined interval of time; a concentration $C(t+1)$ in the next point of time is to be sequentially forecasted according to rules representing relations among Q, V, and C is a single-point information item, the value is converted, by considering the vagueness and uncertainty thereof, into a grade associated with a state quantity by means of functions shown in FIGS. 5 to 7. FIG. 5 shows relations of large and small values of the flow volume Q, FIG. 6 is a graph depicting a relation of high (large) and low (small) values of the flow speed V, and FIG. 7 shows relation of large, intermediate, and small values of the concentration C. In these graphs, the abscissa represents the measured values, whereas the ordinate stands for the grades expressed by real numbers ranging from 0.0 to 1.0 such that a value indicated on the ordinate where the measured value intersects with the pertinent function represents a grade. First, the relations among Q, V, and C determined under the conditions above can be expressed in a plurality of rule tables associated with a state of the object in this example as shown in FIG. 8. For example, the upper-most row of FIG. 8 indicates that if Q and V at an arbitrary point of time are large, C at the next point of time is large, namely, if $Q(t)$ is large and if $V(t)$ is large, $C(t+1)$ is large. The inference of C based on the events and rules above is ordinarily conducted according to the relations among Q, V, and C as follows. Assuming that the grades of the respective events are represented as $\mu_Q$, $\mu_V$, and $\mu_C$; then, the following relation results.

$$\mu_C = \min(\mu_Q, \mu_V) \tag{12}$$

Figure 9:
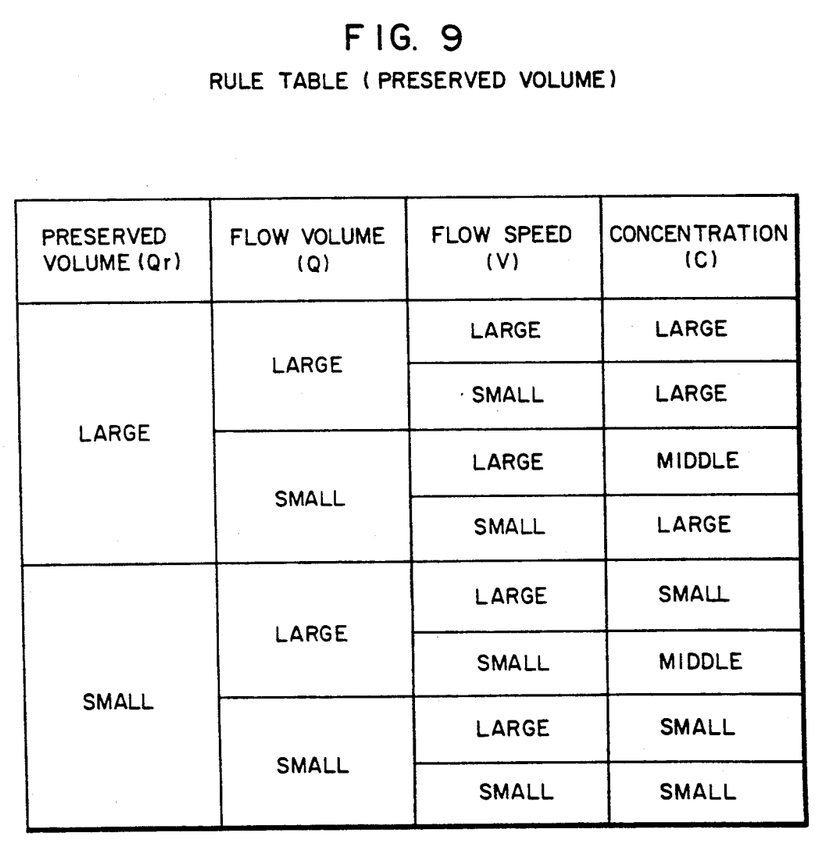
FIG. 9 is a schematic diagram showing a rule table associated with FIG. 8.

If the same result exists, namely, if n grades exist for C, $$\mu_C = \max(\mu_{C1}, \mu_{C2}, \mu_{C3}, \ldots, \mu_{Cn}) \tag{13}$$

is obtained. However, in the inference of this embodiment, as described above, each of Q, V, and C is a single-point information item attended with the vagueness and uncertainty and the measured events are attained at an arbitrary point and are small in number, namely, only three events are to be handled. In consequence, the rules of FIG. 8 may be possibly adapted with an overlapping therebetween depending on the states of the events, which consecutively vary with respect to time. Consequently, it is necessary to infer the rules to be adapted by use of the rule table of FIG. 8. The necessity of the usage of the adaptive rules in this example is considered to be associated with a point that internal states such as the state of the object and the remaining volume or amount of the flowing material in the conductor cannot be appropriately recognized from the problem of the measured events. In this regard, according to this example, there are established correspondences between the grades of the adaptive rules and primary, independent events for which there are not provided determining means to represent internal states. An event is here expressed as a concept of the volume or amount of preserved flowing material. By use of the preserved volume $Q_r$, the rule table of FIG. 8 is changed to that of FIG. 9. As a result, the inference of the adaptive rules becomes to be identical to that of the event $Q_r$. For the inference of $Q_r$, it is only necessary to use the rule table of FIG. 9 and the values of Q, V, and C thus measured. At this point, $Q(t-1)$ and $V(t-1)$ at an arbitrary point of time $t-1$ has been known. Under this condition, $Q_r(t)$ is forecasted based on the measured value of C, namely, the actual $C(t)$, the values of $Q(t-1)$ and $V(t-1)$ employed for the estimation at the point of time $t-1$, and the rule table of FIG. 8. Through the estimation of $Q_r(t)$, the adaptive rules are also forecasted by use of the rule table of FIG. 8, and hence $C(t+1)$ at the point of time $t+1$, namely, the estimated concentration of the flowing material can also be inferred by use of $Q_r(t)$ forecasted from the estimation of $Q(t)$ and $V(t)$ at the point of time t. Description will now be given of an inference method associated with the relations between C and $Q_r$, Q, and V by developing the expression (1) and (2). Assuming the grade of $Q_r$ to be $\mu Q_r$, then $$\mu_C = \min(\mu_{Q_r}, \mu_Q, \mu_V) \quad (12)'$$

$$\mu_C = \max(\mu_{C1}, \mu_{C2}, \mu_{C3}, \ldots, \mu_{Cn}) \quad (13)'$$

Consequently, for the inference of $Q_r$, it is only necessary to use the reverse relations of those expressed above so as to attain $\mu_{Q_r}$, which results in $$\mu_{Q_r} = \begin{cases} \mu_C(\mu_C < \mu') \\ 1 \ (\mu_C \geq \mu')(\text{where, } \mu' = \min(\mu_Q, \mu_V)) \end{cases} \quad (14)$$

$$\mu_{Q_r} = \min(\mu_{Q_{r1}}, \mu_{Q_{r2}}, \mu_{Q_{r3}}, \ldots, \mu_{Q_{rn}}) \quad (15)$$

Figure 10:
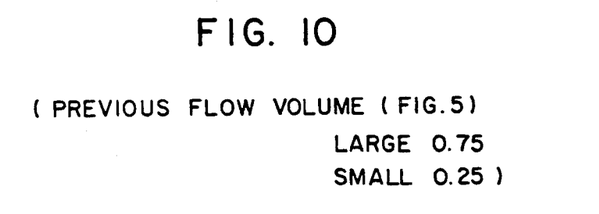
FIGS. 10 and 11 are diagrams showing object data for the measured data in the previous operation.
Figure 11:
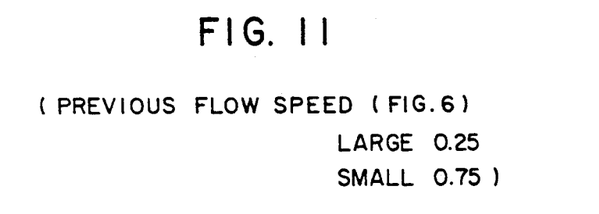
Figure 12:
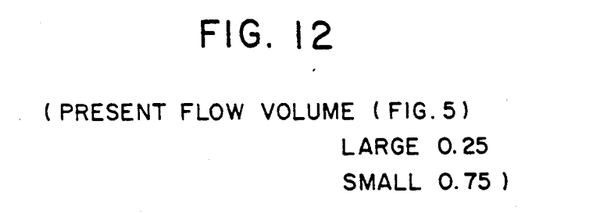
FIGS. 12 to 14 are diagrams showing object data for the measured data in the present operation.
Figure 13:
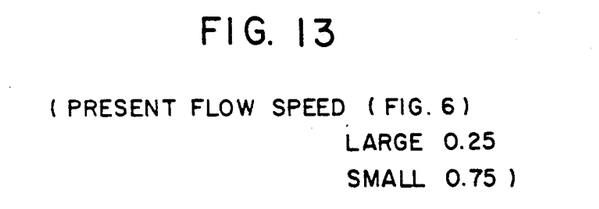
Figure 14:
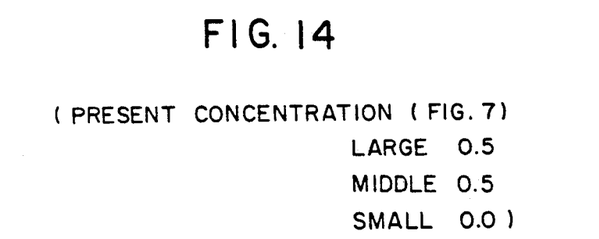
Figure 15:
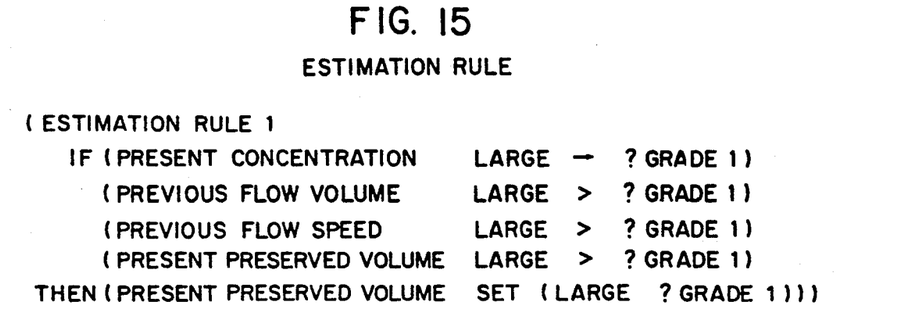
FIG. 15 is a schematic diagram showing an example of estimating rules.
Figure 16:
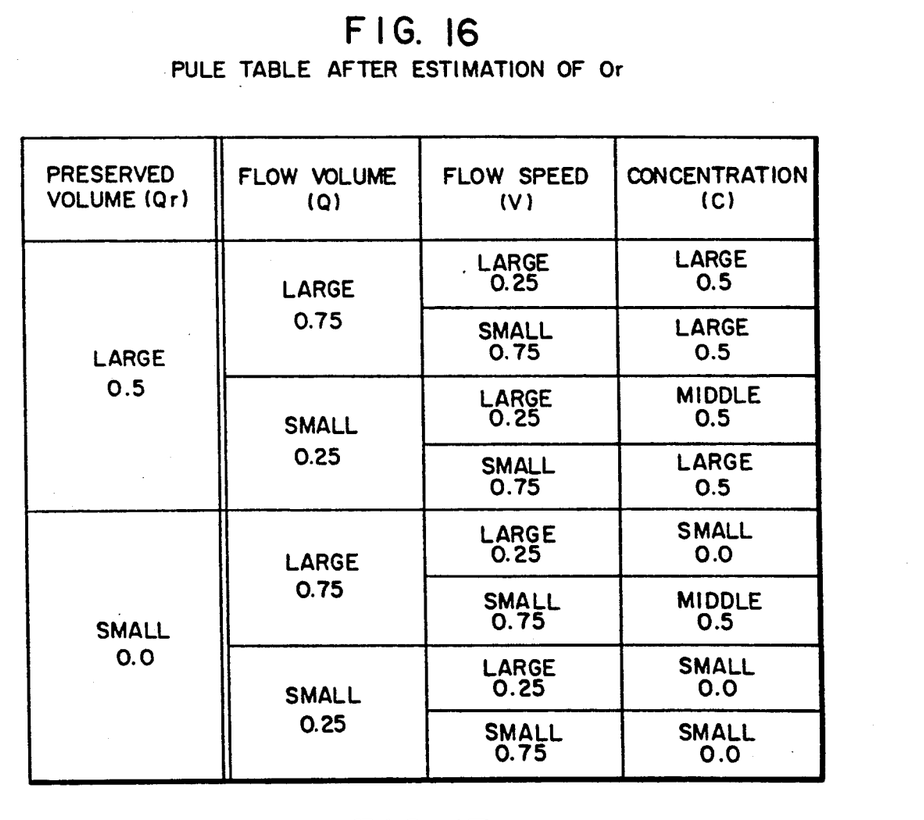
FIG. 16 is a diagram showing a rule table obtained after the estimation.
Figure 17:
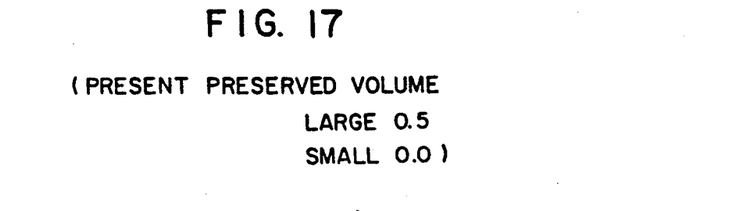
FIG. 17 is a diagram showing objective data of the present preserved volume after the estimation.
Figure 18:
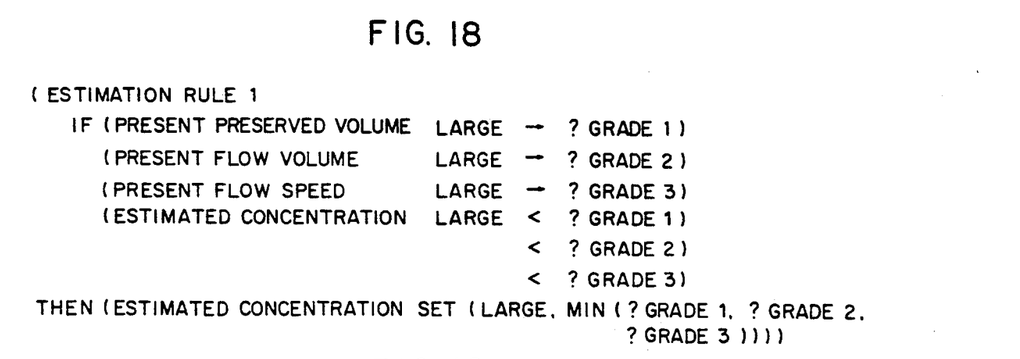
FIG. 18 is a diagram schematically showing estimating rules.
Figure 19:
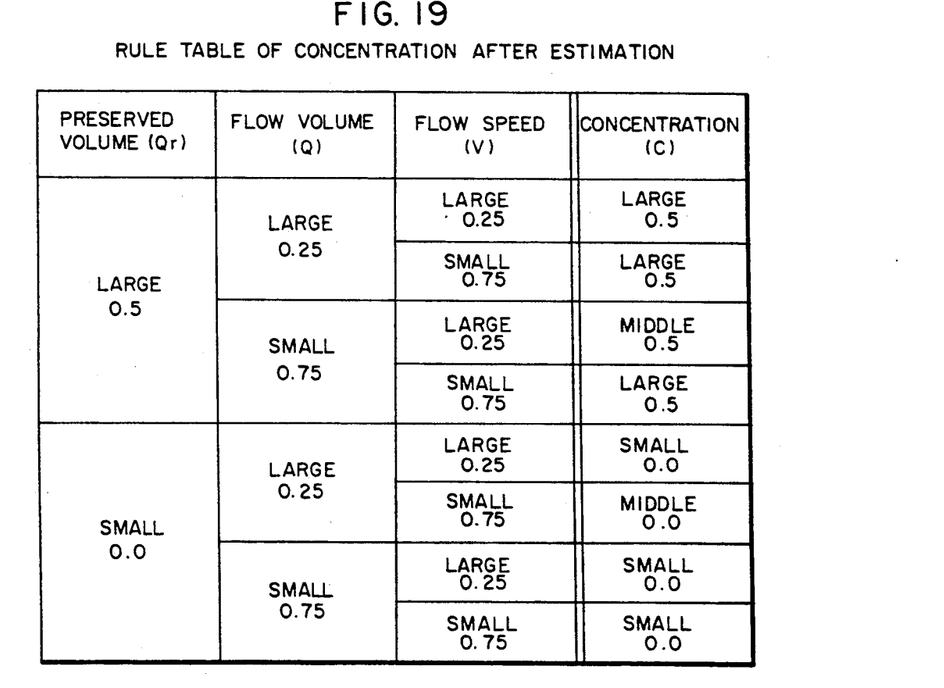
FIG. 19 is a diagram showing a rule table after the estimation.
Figure 20:
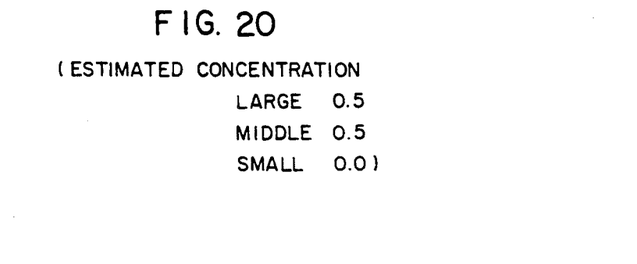
FIG. 20 is a schematic diagram showing estimation object data after the estimation.
Figure 21:
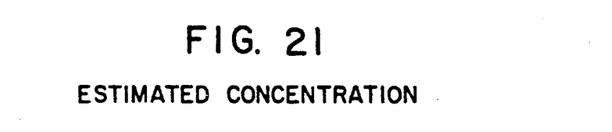
FIG. 21 is a graph showing a function of concentration employed in the conversion to obtain a fixed value.
Figure 22:
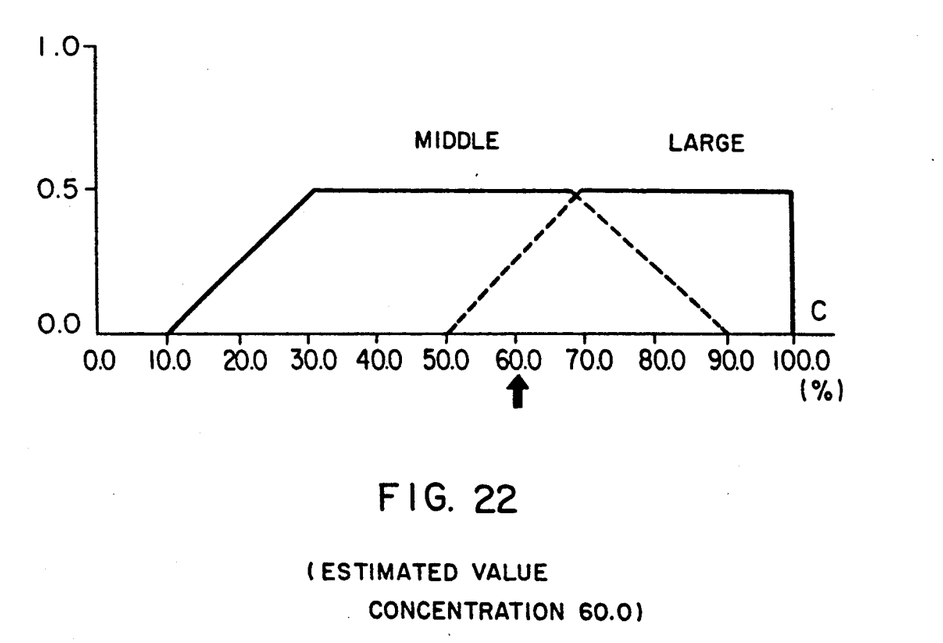
FIG. 22 is a diagram schematically showing estimation value object data after the conversion.

The value of $Q(t-1)$ and $V(t-1)$ at the previous point of time $t-1$ has been measured as 6 g/cm³ and 4 cm/s, respectively, and these values are converted by use of the functions of FIG. 6 so as to be stored as object data items in FIGS. 10 and 11. Similarly, the values of $Q(t)$, $V(t)$, and $C(t)$ at the next point t (current point) have been measured as 4g/cm³, 4.0 cm/s, and 70.0% respectively, which are listed as object data in FIGS. 12, 13 and 14. In this situation, $Q_r(t)$ can be forecasted by use of $Q(t-1)$ and $V(t-1)$ of FIGS. 10 and 11, C(t) of FIG. 14, the rule table of FIG. 9, and the expressions (14) and (15). In FIG. 15, there is shown a rule to be employed to estimate $Q_r$ associated with the upper-most row of FIG. 9 based on the expressions (14) and (15). This rule means that when the large value of the current concentration is assigned with ?grade 1, if each of the grades of the large values respectively of the previous flow volume, the previous flow speed, and the current preserved volume is greater than the grade above, the present preserved volume is to be set. The other rules are also to be appreciated in a similar fashion. The results of $Q_r$ after the estimation are inserted into the rule table as shown in FIG. 16; and the object data of $Q_r$ after the estimation are shown in FIG. 17. In this example, based on the inference method of the expression (14), a region of $Q_r$ having values less than 1.0 is assumed to be an appropriate region, and hence the values beyond this region are considered to have a low reliability for the adaptability and a warning is issued. Inference of $C(t+1)$ at the point of time $t+1$ can be achieved by use of $Q_r$ thus estimated. FIG. 18 shows an example of a rule for estimating the concentration C associated with the upper-most row of FIG. 9 by use of the expression (12) and (13). The rule indicates that assuming ?grade 1 is assigned to the case of the large value for the present preserved volume, that ?grade 2 is similarly assigned to the case of the large value for the present flow volume, and that ?grade 3 is assigned to the case of the large value for the present flow speed, if the grade associated with the large value of the estimated concentration is smaller than the grade values above, the minimum value thereof is to be set. FIG. 19 shows a rule table in which the results of the estimation effected by the similar rule are inserted, whereas FIG. 20 shows object data of $C(t+1)$ thus estimated. For example, the maximum value (max) of the values 0.5 and 0.0 of the concentration is assumed to be 0.5 and is marked in FIG. 20; thereafter, in this embodiment, based on the object data of FIG. 20, there is achieved a conversion from the grades to quantitative values. The conversion is effected such that portions of the graph of the function of FIG. 7 exceeding the respective grades of FIG. 20 are removed so as to determine the center of gravity (marked with an arrow) of the remaining portion (FIG. 21). FIG. 22 shows object data of estimated values after the estimation. The processing above is achieved for each arbitrary point of time. As a result, estimation is conducted so as to select from a plurality of knowledge items adaptive knowledge items such as adaptive rules which dynamically and continuously vary with respect to time or primary events such as a preserved volume for which no determining means are provided, thereby enabling an inference appropriate for each point of time to be effected.

According to the embodiment above, any events can be converted into and represented with arbitrary grades associated with vagueness and uncertainty thereof, so that there is configured an arbitrary inference by use thereof so as to conduct an estimation and a forecast. In particular, the estimation and the forecast are necessarily attended with vagueness and uncertainty; and this technology is convenient in a case where the input information item is insufficient, for example, a single-point information item. Moreover, quantitative information and qualitative information can be handled at the same time. As for the knowledge to be used, there can be constructed an inference and an estimation employing qualitative information such as vague causality existing among events, which enables a more human method to be provided.

While particular embodiments of the present invention have been shown and described, it will be obvious to those skilled in the art that various changes and modifications may be made without departing from the present invention in its broader aspects.

We claim:

1. A knowledge processing system in which each rule is represented in a form of a pair having a condition part and an action part so as to conduct an inference, the system comprising:

inference engine means for executing the inference;

object data storage means connected with said inference engine means for holding object data to be accessible therefrom;

rule storage means connected with said inference engine means for holding rules each including a pair of condition part related to an event to be measured and an action part specifying a grade representing a degree to which the event is satisfied based on the object data from said object data storage means and the inference to be executed by said inference engine means;

procedure storage means connected with said inference engine means for holding entities of the inference to be executed by said inference engine means based on a result supplied from said rule storage means, said inference engine means determining said condition part of one of said rules held in said rule storage means based on said object data held in said object data storage means to execute one of said entities; and estimation rule storage means connected with said inference engine means for holding a plurality of estimation rules each including a pair of a condition part related to an event to be measured and an action part related to an event not to be measured used by an estimating means for estimating an estimation value associated with a non-measured predetermined event whereby the inference may be executed by using the estimation value as a condition part related to said non-measured predetermined event, to execute an entity of an inference based on a result supplied from said estimation rule storage means.

2. The knowledge processing system according to claim 1 further comprising forecast rule storage means connected with said inference engine means for holding a forecast rule used by a forecast means for estimating a forecast value related to an event to be measured depending on said object data in said object data storage means and said value in said estimation rule storage means.

3. The knowledge processing system according to claim 2 further comprising a warning rule used by a warning means for issuing a warning, the warning rule including an executing procedure for another action part which issues the warning and a condition part having a condition satisfied when said forecast value in said forecast rule storage means is outside a predetermined range held in a rule table and determined by said inference engine means.

4. The knowledge processing system according to claim 1 wherein said estimation rule storage means includes rule means including an action part related to an event to be measured and a condition part related to a comparison of an event to be measured and an event not to be measured to obtain a grade representing a degree of satisfaction of the event to be measured.

5. The knowledge processing system according to claim 2 wherein said forecast means produces said forecast value of the event to be measured depending on a result in said estimation rule storage means and on a result produced from said rule group means.

6. An adaptive knowledge inference method in a knowledge processing system comprising the steps of:

holding in an object data storage connected with an inference engine object data to be accessible therefrom;

holding in a rule storage connected with said inference engine a plurality of rules each including a pair of a condition part related to an event to be measured and an action part specifying a grade representing a degree to which the event is satisfied based on the object data from said object data storage and an inference to be executed by said inference engine;

holding in a procedure storage connected with said inference engine entities of an inference to be executed by said inference engine based on a result supplied from said rule storage said inference engine determining said condition part of one of said rules held in said rule storage based on said object data held in said object data storage in order to execute one of said entities, said condition part represented with logical arithmetic expressions including those of fuzzy logic, said action part supplies a conclusion related to grades representing degrees to which a plurality of events are respectively satisfied or unsatisfied and/or issues an instruction to execute a plurality of procedure processings such that knowledge associated with an object problem is represented and is described by use of the plurality of rules;

representing a described rule of the plurality of rules, as having a condition part and an action part including an event related to a non-measurable event and another described rule of the plurality of rules, as having a condition part including said non-measurable event and an action part including an event related to a measured event;

inferring by the inference engine a grade representing a degree at which an event corresponding to an unmeasurable state is satisfied according to the action part of at least one of the described rules of the plurality of rules based on grades respectively representing degrees at which events corresponding to measurable states are respectively satisfied when drawing a final conclusion, by establishing correspondences between states of an external field of the system and events, in a case where the states of the external field of the system for which correspondences are established with respect to the events comprise knowledge;

processing the inference by repeatedly applying the rules depending on the grades of satisfaction of the events; and, drawing the final conclusion by use of a result of the inference.

7. The adaptive knowledge inference method in a knowledge processing system according to claim 6 further comprising the steps of:

drawing the final conclusion by establishing correspondences between measured values of states and events in an external field of the system;

permissibly drawing a wrong final conclusion depending on the states of the external field of the system;

setting an assumed event after drawing said wrong final conclusion for adding rules associated with the assumed event and inferring a grade of satisfaction of the assumed event from grades of satisfaction of events determined in association with measurable states of the external field of the system by use of at least a portion of described rules;

thereby drawing the final conclusion by use of a result of the inference.

8. The adaptive knowledge inference method in a knowledge processing system according to claim 6 further comprising the steps of:

including causality knowledge associated with time in said rules and a forecast of a grade of satisfaction of an event in a portion of the final conclusion to be drawn;

preparing a forecast rule describing the causality knowledge with respect to time for said unmeasurable event corresponding to said unmeasurable state and/or for the assumed event inferring present values of grade of satisfaction of the unmeasurable event and the assumed event based on grades of satisfaction of events determined by the measurable states up to a present point of time and by use of at least a portion of the described rules;

inferring and forecasting the grade of satisfaction of the assumed event based on a result of the inferring present values and the forecasted rule; and, thereby obtaining a forecasted value of a grade of satisfaction of a final conclusion event by use of a result of the forecast and the inferring present values and the grades of satisfaction of the event determined by the measurable state up to the present point of time.

9. The adaptive knowledge inference method in a knowledge processing system according to claim 6 wherein for at least a portion of events of which grades of satisfaction can be attained through an adaptation of the rules, quantitative values are estimated for states of the external field of the system based on the grades of satisfaction of events, thereby furthering inference processing by use of a result of the estimation.

10. An adaptive knowledge inference method in a knowledge processing system according to claim 6 wherein in a case where an inference is effected for a grade of an unmeasurable event or an assumed event or where a quantitative value is obtained for a state of an external field of the system corresponding to said event, if the inferred grade of satisfaction or the quantitative value is beyond a predetermined range of values or is different from a predetermined value, a warning or a notification is issued to a system user or/and a subsequent inference is continuously executed by use of a predetermined default value.

11. The adaptive knowledge inference method in a knowledge processing system according to claim 6 wherein said entities of the procedure storage are described in rule knowledge and supplied to the knowledge processing system.

12. The adaptive knowledge inference method in the knowledge processing system according to claim 6 further comprising the steps of:

analyzing said grade of said non-measurable event;

estimating a quantitative value obtained for a state of said external field to produce a result;

issuing a warning to the knowledge processing system if said analyzing and estimating produces a result beyond a predetermined range of values; and, continuously executing subsequent inferring until said result is produced within said range.

13. A knowledge processing system in which each rule is represented in a form of a pair having a condition part and an action part so as to conduct an inference, comprising:

inference engine means for executing the inference;

object data storage means connected with said inference engine means for holding object data to be accessible therefrom;

rule storage means connected with said inference engine means for holding rules each including a pair of a condition part related to an event to be measured and an action part specifying a grade representing a degree to which the event is satisfied based on the object data from said object data storage means and the inference to be executed by said inference engine means;

procedure storage means connected with said inference engine means for holding entities of said processing to be executed by said inference engine means based on a result in said rule storage means;

said inference engine means receiving sensor data from sensor means connected thereto, based on the processing described in said rule storage means so as to update a corresponding part of the object data held in said object data storage means said inference engine means determining said condition part of one of said rules held in said rule storage means based on said object data held in said object data storage means to execute one of said entities; and, estimation rule storage means connected with said inference engine means for holding a plurality of estimation rules each including a pair of a condition part related to an event to be measured and an action part related to an event not to be measured used by an estimating means for estimating an estimation value associated with a non-measured predetermined event;

wherein said inference engine means executes the estimation rule based on said updated object data.

14. The knowledge processing system according to claim 13 further comprising forecast rule storage means connected to said inference engine means for holding a forecast rule used for estimating a forecast value related to an event to be measured depending on said object data in said object data storage means and said value in said estimation rule storage means.

15. The knowledge processing system according to claim 14 further comprising a warning rule including an executing procedure for another action part for issuing a warning and a condition part having a condition satisfied when said forecast value in said forecast rule storage means is outside a predetermined range held in a rule table and determined by said inference engine means.

16. The knowledge processing system according to claim 13 wherein said estimation rule storage means includes rule means including an action part related to an event to be measured and a condition part related to a comparison of an event to be measured and an event not to be measured to obtain in a rule implementation means a grade representing a degree of satisfaction of the event to be measured.

* * * * *